Nov. 14, 1933.                G. J. LOWRES                1,934,985
                            OPTICAL MOUNTING
                            Filed Dec. 8, 1931
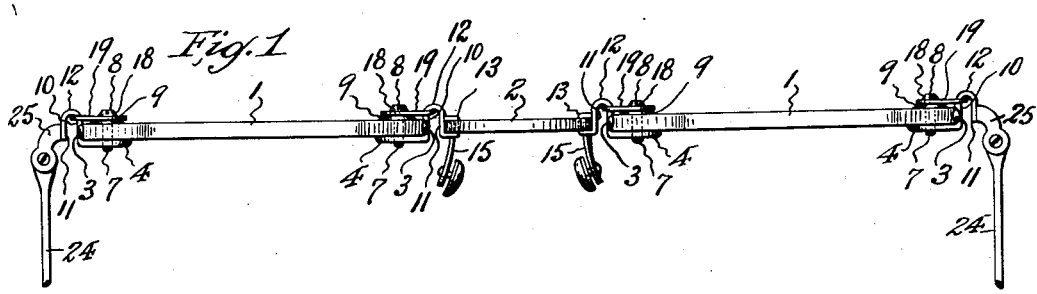
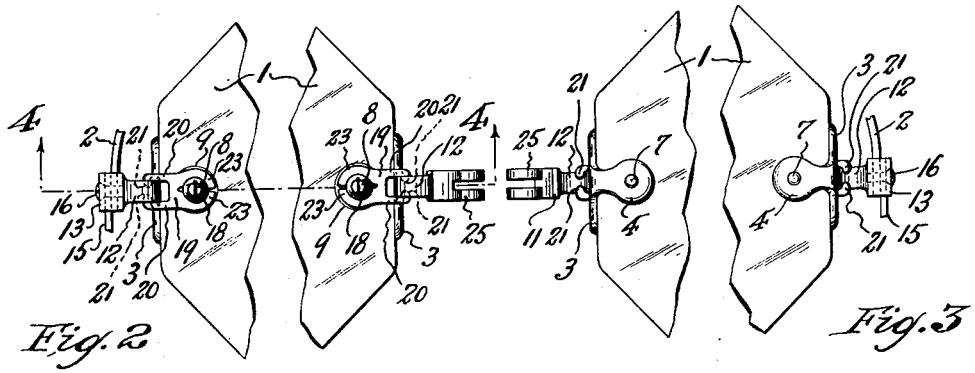
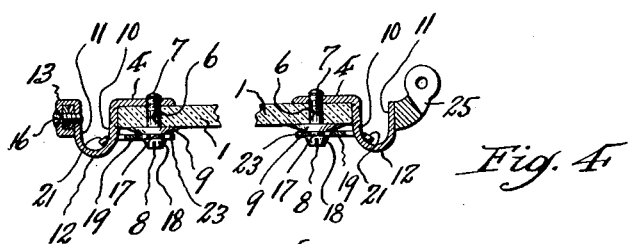
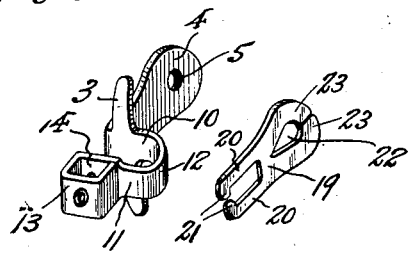
INVENTOR
George J. Lowres,
BY George D. Richards
ATTORNEY Patented Nov. 14, 1933

1,934,985

UNITED STATES PATENT OFFICE 1,934,985

OPTICAL MOUNTING

George J. Lowres, Newark, N. J.

Application December 8, 1931. Serial No. 579,712

3 Claims. (Cl. 88—42)

This invention relates to improvements in rimless optical mountings, and the invention has reference, more particularly, to improved means for connecting nose bridge and guard elements with eye-glass and spectacle lens, and also for connecting temple joints and similarly located parts to such lens.

This invention has for its principal object to provide mounting connections for the purposes mentioned having flexible post portions, whereby the lenses of the eye-glasses or spectacles are resiliently connected with the frame and other parts supporting the same, to the end that transmission of breaking stresses and strains to the lenses is substantially reduced.

The invention has for further objects to provide a mounting connection which readily adapts itself to fit any thickness of lens; which is easy to assemble with a lense without necessity for special or delicate adjustments; and which may, in some forms, be provided with a novel snapover link to reenforce the connection and reduce likelihood of loosening of fastening screws by which the connection is held assembled to the lens.

Other objects of this invention, not at this time more particularly enumerated, will become apparent in the following detailed description of the same.

An illustrative embodiment of this invention is shown in the accompanying drawing, in which:—

Fig. 1 is a top edge elevation of spectacles provided with the novel mounting connections according to this invention; Fig. 2 is an enlarged front face view of a lens provided with the novel mounting connections; Fig. 3 is a rear face view of the same; and Fig. 4 is a sectional view of the same, taken on line 4—4 in Fig. 2; and Fig. 5 is a perspective view of elements of a mounting connection, according to this invention, disassembled.

Similar characters are employed in the above described views, to indicate corresponding parts.

Referring to the said drawing, the reference character 1 indicates the lenses of spectacles or eye-glasses as the case may be. The novel mounting connection by which a lens 1 is operatively connected and assembled with a nose bridge member 2 or like frame element, comprises the strap portion 3 adapted to abut the peripheral edge of the lens 1. Integrally connected with and laterally off-set from one side of said strap portion is a connection plate 4 of suitable peripheral shape and adapted to extend over and engage a face surface of said lens 1, preferably the rear face thereof. Said connection plate 4 is provided with a suitably located internally screw threaded opening 5 extending therethrough. This opening 5 is adapted to register in alignment with a transverse opening 6 provided in the marginal portion of said lens which underlies said connection plate. The reference character 7 indicates a fastening screw, having adjacent to its slotted head 8, an annular lateral flange 9 providing an abutment shoulder. To secure the connection plate and strap portion in operative assembled relation to the lens 1, the shank of said fastening screw 7 is passed through the opening 6 of the lens and thereupon is screwed into the opening 5 of said connection plate 4 until the abutment shoulder formed by the flange 9 abuts the front face of the lens. Also connected with said strap portion 3, preferably as an integral part thereof, and so as to extend from the side thereof which is opposite to that from which said connection plate extends, is a flexible arm or stud portion, preferably comprising a U-shaped member lying in a plane substantially at right angles to the face plane of the lens 1 and consisting in the arms 10 and 11 joined by a bowed or elbow portion 12, the arm 10 being adjoined to said strap portion 3. The metallic stock from which said U-shaped member is formed is preferably flattened into a band-like strip so that the arms 10 and 11 are capable of resilient movement toward and from each other. Suitably formed and connected with the free end portion of the arm 11 of said U-shaped member is a box portion 13. This box portion 13 is preferably formed by folding an extension of said arm 11 upon itself to provide a vertically extending box-like socket opening 14, into which may be inserted an anchoring end of the nose-bridge 2, a nose guard element 15, or both, in manner already familiar to the art; said part or parts being secured relative to said box portion 13 by a fastening screw 16 or by any other desired means or in any other suitable manner.

In its simplest form the novel mounting connection may comprise merely the parts already above described. In addition to the described basic structure means may be provided for further reenforcing the connected assembled relation established between the mounting connections and the lens 1. This latter means comprises a snap-over clip strap structure for detachable connection between the headed end of the fastening screw 7 and the U-shaped flexible arm or stud portion. When utilizing this clip strap structure, the fastening screw 7 is provided with an annular recess or groove 17 between the head 8 and flange 9, and the lateral sides of the head 8 are of outwardly tapering or conical formation, as at 18. The clip strap comprises a thin plate-like member 19 having at one end a pair of laterally spaced arms 20 terminating at their free ends in inwardly and laterally directed lugs 21. In one form, the opposite end of said plate-like member 19 is arranged to provide an eye portion 22 bounded by expansible or yieldable arms 23. In assembling this clip strap, the spaced arms 20 are passed around the arm 10 of the U-shaped member or stud portion so as to straddle the same, when the plate-like member 19 is turned into a plane parallel to the face plane of the adjacent lens 1, and whereby, when so turned, the lugs 21 will engage under the bowed or elbow portion 12 of said U-shaped member or stud portion, thus anchoring the clip strap in connection with the latter. When thus arranged the eye portion 22 of the plate-like member 19 is registered in alignment with the headed end of the fastening screw 7, whereupon by pressing the former toward the latter, the yieldable arms 23 will snap over the conical head 8 and into the recess or groove 17, thus anchoring the clip strap thereto. It will be observed, from an inspection of the drawing, that said clip strap serves as a reenforcing tie between the U-shaped member or stud portion and said fastening screw, so that, while a requisite degree of resilient play or flexibility is permitted in the functioning of the U-shaped member or stud portion, nevertheless the arm 10 of the latter and the strap portion 3 of the connection is restrained by said clip strap against bending away from the periphery of the lens 1 or from other abnormal displacement relative thereto.

From the above it will be obvious that the novel mounting connection, while serving adequately to mechanically interconnect lenses with the nose bridge member 2 or other frame element or elements, nevertheless, by virtue of the resilient U-shaped member or stud portion permits a relative flexing of lens and frame elements calculated to absorb strains and stresses which might be otherwise transmitted to the lens 1 with risk of breaking the latter. Another advantage of the mounting connection lies in the ease and simplicity with which it may be assembled in connection with the lens 1, without necessity for adjusting straps or connection plates with involved risk of gripping the lens too tightly with production of resultant stresses likely to increase risk of breakage thereof; furthermore, since the mounting connection possesses a connection plate 4 only at one side of the lens, with which cooperates the flanged fastening screw 7, it will be apparent that the mounting connection is readily adapted to fit various thicknesses of lens by merely turning the screw more or less through the connection plate. The provision of the described clip strap, in addition to the functions above ascribed thereto, also furnishes a means tending to hold the fastening screw 7 from becoming loose.

The novel mounting connection may also be employed at the outer ends of the lenses 1 for flexibly connecting thereto bows or temples 24, such as usually provided in spectacles, or for attaching cord connection ears to eye-glasses. The mounting as thus used is of the same construction as already above described, and as indicated by corresponding reference letters applied thereto in the accompanying drawing, except that in place of the box portion 13, there is suitably connected with the arm 11 of the flexible U-shaped member or stud portion a hinge knuckle element 25 or other suitable part.

I am aware that many variations may be made as to size, shape and arrangement of the several parts making up the novel mounting connection of this invention within the scope of the latter as defined in the appended claims; hence, I do not limit myself to the exact constructions shown in the accompanying drawing and above described, such showing and description being intended to be considered as illustrative and not in a limiting sense.

I claim:—

1. A mounting connection for the purposes described, comprising a strap portion to abut the periphery of a lens, a connection plate connected with said strap portion and disposed to overlie a face surface of the lens, a flanged fastening screw to pass through the lens and screw into said connection plate with the flange thereof abutting the opposite face surface of the lens, means to hold a frame element, a U-shaped flexibly resilient member extending between said strap portion and said holding means, said member being disposed in a plane substantially at right angles to the face plane of the lens, said fastening screw having a head exteriorly of its flange, said head having an undercut recess, a bifurcate clip strap having arms to straddle the adjacent side of said U-shaped member, said arms having inwardly directed lateral lugs to embrace the straddled portion of said U-shaped member, and said clip strap having resilient means at its opposite end to snap over said head and into said recess to couple the same with said screw.

2. A mounting connection for the purposes described, comprising a strap portion to abut the periphery of a lens, a connection plate connected with said strap portion and disposed to overlie a face surface of the lens, a flanged fastening screw to pass through the lens and screw into said connection plate with the flange thereof abutting the opposite face surface of the lens, a U-shaped flexibly resilient member disposed in a plane substantially at right angles to the face plane of the lens, said member having one arm thereof rigidly joined to said strap portion, the free arm of said member being angularly doubled back upon itself to provide a vertically open box, said fastening screw having a head exteriorly of its flange, said head having an undercut recess, a clip strap having arms to straddle the adjacent side of said U-shaped member, said arms having inwardly directed lateral lugs to embrace the straddled portion of said U-shaped member, and said clip strap having bifurcate resilient means at its opposite end to snap over said head and into said recess to couple same with said screw.

3. A lens, bridge and guard connection means for rimless optical mountings including, in one unitary structure, a connection plate having an internally threaded opening therethrough, a U-shaped member comprising spaced arms joined by a bowed elbow portion, one of said arms extending from the inner end of said plate at right angles thereto, said arm having upwardly and downwardly extending strap fingers projecting therefrom, and the free end portion of the other arm being bent to provide a section extending away therefrom at right angles to the plane thereof, a section parallel but spaced therefrom, and a section extending toward and to the same at right angles thereto, said sections providing with said last mentioned arm a vertically open box.

GEORGE J. LOWRES.